United States Patent [19]

Diaz

[11] 4,324,030
[45] Apr. 13, 1982

[54] APPARATUS FOR REMOVING A GRINDING WHEEL

[76] Inventor: Juan A. Diaz, 764 Spring St., Aurora, Ill. 60505

[21] Appl. No.: 141,113

[22] Filed: Apr. 17, 1980

[51] Int. Cl.³ .............................................. B23P 19/04
[52] U.S. Cl. ....................................... 29/240; 29/267; 29/270; 51/168; 51/262 R
[58] Field of Search ...................... 29/270, 267, 281.1, 29/240, 240.5; 51/168, 262; 81/3 R, 129, 128

[56] References Cited

U.S. PATENT DOCUMENTS

| | | |
|---|---|---|
| 631,056 | 8/1899 | Van Etten et al. .................... 81/129 |
| 1,475,791 | 11/1923 | Callista . |
| 2,454,489 | 11/1948 | Sullivan . |
| 2,695,482 | 11/1954 | Polster et al. . |
| 2,773,430 | 12/1956 | Berthiez . |
| 3,925,878 | 12/1975 | Kikucki . |
| 4,009,867 | 3/1977 | Diffenderfer ...................... 254/10.5 |

*Primary Examiner*—Robert C. Watson
*Attorney, Agent, or Firm*—Kinzer, Plyer, Dorn & McEachran

[57] ABSTRACT

An apparatus for use in removing and replacing a grinding wheel of a portable industrial grinder of the type having an output shaft, a grinding wheel support sleeve on the shaft, a non-circular collar formed on the sleeve, and laterally extending handles. The apparatus includes an upstanding housing having a top wall with a slot formed therein. The slot is open at one end and is dimensioned to receive and engage the non-circular collar of the shaft support sleeve of the portable grinder with the grinding wheel being supported on the top wall. The housing is equipped with an opening in at least one side thereof to permit the portable grinder to be positioned in the housing below the slotted top wall. A grinding wheel clamp adapted to engage the grinding wheel when it is supported on the top wall of the housing is provided. The grinding wheel clamp has two fixed fingers which engage the periphery of the grinding wheel at circumferentially spaced locations thereon and a movable finger circumferentially spaced relative to the two fixed fingers. A support arm is provided which extends over the top wall of the housing and is pivotally mounted relative to the housing for rotation about a vertical axis. The grinding wheel clamp is pivotally connected to the support arm and is slidable along the length of a portion of the support arm. The grinding wheel clamp may be releasable locked at selected positions along the length of the portion of the support arm. The movable finger is pivotally mounted for movement at right angles to the direction of unloosening rotation of the grinding wheel so that the arm of which the finger is a part can be used both to clamp the grinding wheel and to rotate it to loosen it.

4 Claims, 2 Drawing Figures

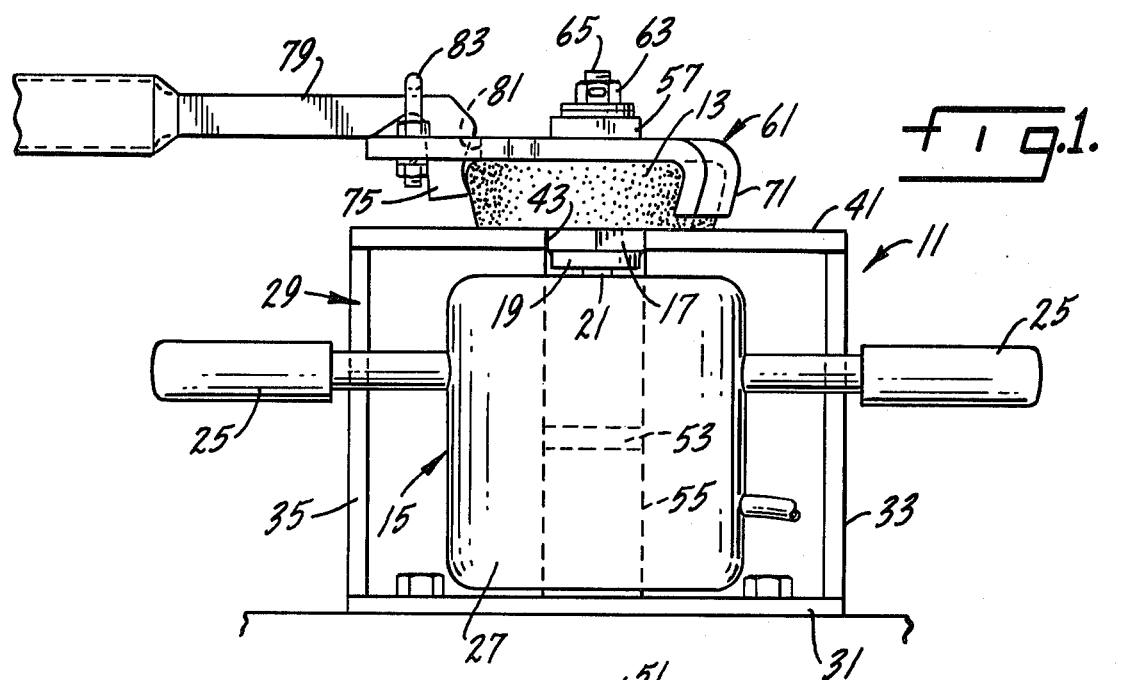
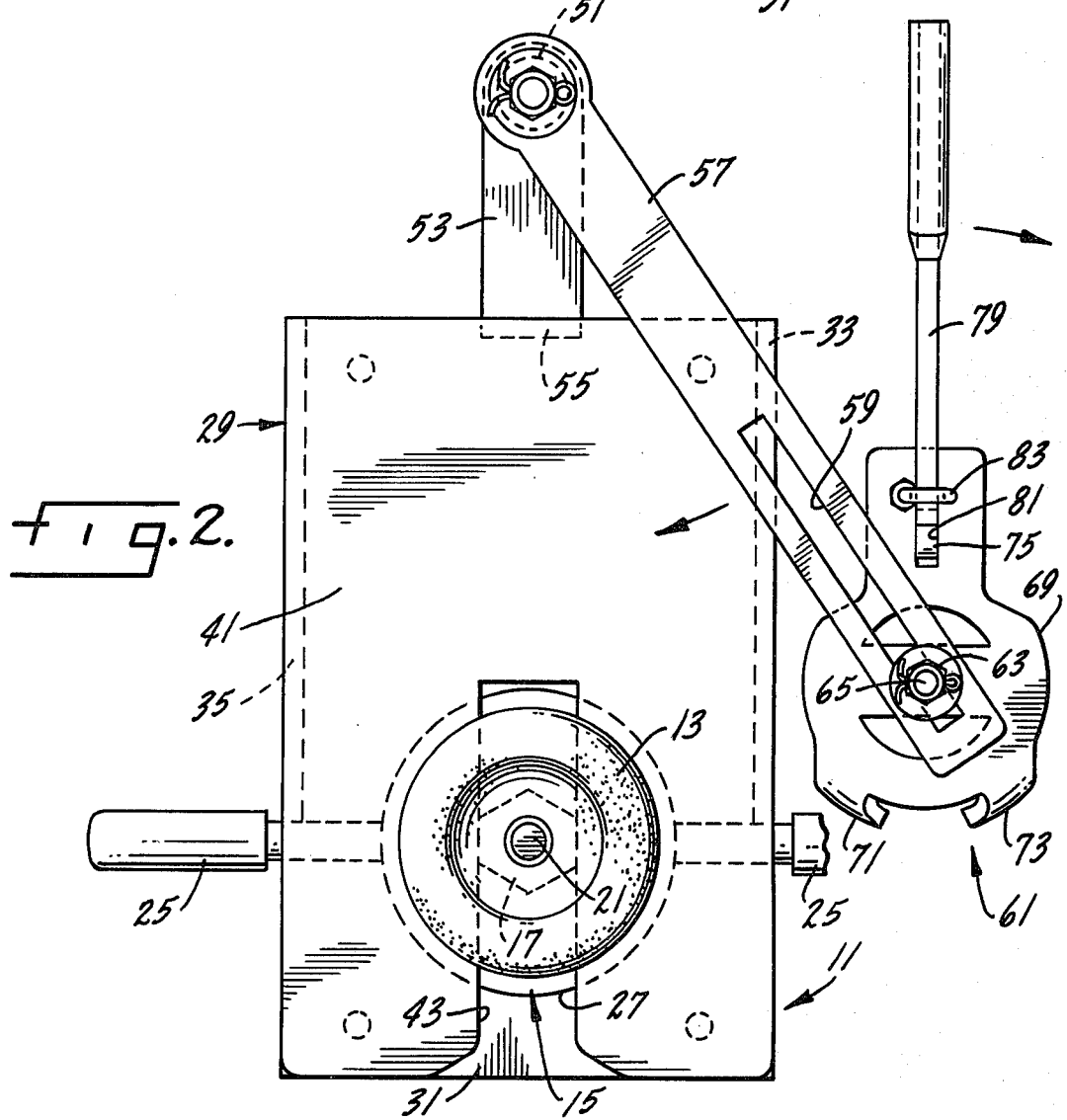

APPARATUS FOR REMOVING A GRINDING WHEEL

BACKGROUND AND SUMMARY OF THE INVENTION

Heavy duty portable grinders, both electric and pneumatic, are commonly used in industrial plants and especially in heavy metal working plants involved in the manufacture of vehicles, heavy industrial equipment and the like. These portable grinders usually have laterally extending handles so that they can readily be manipulated by a worker. Because the grinding wheels are items which wear out, they must be frequently replaced. The grinding wheel must be securely fastened to the end of a grinder shaft so that it will not accidentally fly off the shaft while it is being used. As a consequence of the secure fastening of the grinding wheel to the shaft, it is extremely difficult to remove the grinding wheel from a shaft when it is worn out and ready for replacement. Grinding wheels are conventionally secured to the end of the portable grinder shaft either by internal threads formed as part of the grinding wheel or by a large nut, one of which engages the threads of the grinder shaft. Even after removal of the nut, if one is used, it is frequently difficult to remove the grinding wheel from the shaft because it has become wedged thereon due to rotation of the grinder shaft which tightens the threads. Because the portable industrial grinders are heavy and awkward to handle, it is very difficult to support the grinders while the grinding wheels are being manipulated for removal.

This invention is directed to an apparatus for use in removing and replacing a grinding wheel of a portable industrial grinder, specifically a grinder of the type having a sleeve with a non-circular collar for supporting the grinding wheel mounted on the shaft.

An object of this invention is an apparatus which supports a heavy duty portable industrial grinder and its grinding wheel during removal and replacement of a grinding wheel.

Another object of this invention is an apparatus which securely clamps the grinding wheel and permits it to be rotated to be unloosened from the portable grinder shaft.

Another object of this invention is an apparatus which supports a portable industrial grinder and prevents its shaft from rotating during removal and installation of a grinding wheel.

Other objects may be found in the following specification, claims and drawings.

BRIEF DESCRIPTION OF THE DRAWINGS

FIG. 1 is a front elevational view of the apparatus of my invention being used to remove a worn grinding wheel from a heavy duty industrial grinder; and FIG. 2 is a top plan view of the apparatus of FIG. 1 but showing the grinding wheel clamp and support arm in a different position.

DESCRIPTION OF THE PREFERRED EMBODIMENT

My invention is shown embodied in an apparatus 11 in FIG. 1 of the drawings which is intended for use in removing and replacing a grinding wheel 13 which is a replaceable element of a heavy duty portable industrial grinder 15. The grinding wheel is supported on a non-circular collar 17 of a sleeve 19 attached to the end of a threaded shaft 21 of the grinder. The grinding wheel is held on the end of the shaft either by internal threads formed as part of the grinding wheel or by means of a nut. The portable industrial grinder may be equipped with handles 25 which are attached to the main motor housing 27 thereof, which is either electric or pneumatic, to permit a workman to handle and manipulate the grinder.

The apparatus 11 of this invention includes a housing 29 having a base 31 and upstanding side walls 33 and 35. The base rests upon and may be bolted, as is shown, to a suitable support such as a tool or work bench. The side walls extend distances along the base less than the length of the base. The back and front of the housing are open. A top wall 41 is mounted on the tops of the side walls 33 and 35 and extends cantileverly in front of the side walls and over the base 31. A slot 43 is formed in the top wall and extends inwardly from the front thereof, terminating short of the rear of the top wall. The slot width is dimensioned so that it snugly receives the non-circular collar 17 of a grinder.

An upstanding post 51 is located to the rear of the back of the housing 29. The post 51 is mounted on an arm 53 which is cantileverly attached to an upright member 55 extending between the base 31 and top wall 41 of the housing 29. The post projects above the top wall of the housing. A horizontally extending arm 57 is pivotally mounted at one end on the top of post 51 so that it can be swung in a generally horizontal plane. This arm is sufficiently long to extend over the slot 43 formed in the top wall 41 of the housing. An elongated slot 59 is formed in the arm near the free end thereof.

A grinding wheel clamp 61 is pivotally connected to the arm 57 by a removable fastener 63 consisting of a threaded stud 65 anchored in the clamp and a nut 67 which threads on the stud. The clamp 61 includes a hand-like member 69 having downwardly bent fixed fingers 71 and 73 which are circumferentially spaced relative to each other. The clamp also includes a movable finger 75 which is circumferentially spaced relative to the two fixed fingers 71 and 73. The movable finger is formed as one end of a pivotable arm 79. The finger 75 extends through a slot 81 in the hand-like member 69 to engage the outer periphery of the grinding wheel 13. A steel loop 83 fastened to the hand-like member 69 fits over the pivotal arm 79 to hold the arm onto the hand-like member 69 while permitting pivotal movement of the finger 75 in a direction normal to the plane in which the clamp rotates about the fastener 63 connecting it to the arm 57.

The use, operation and function of this invention are as follows:

When it is necessary to remove a worn grinding wheel 13 from the motor housing 27 of the portable industrial grinder 15, the motor housing 27 is inserted into the housing 29 of the apparatus 11 through the front opening so that the bottom of the grinder motor housing 27 is positioned slightly above the base 31 of the housing 29. The housing side walls 33 and 35 are dimensioned so that when the grinding wheel 13 mounted on the shaft 21 of the grinder is resting on the top wall 41 of the apparatus, the non-circular collar 17 of the sleeve 19 of the grinder will be located in the slot 43 formed in the top wall, and the bottom of the grinder motor housing 27 will be located slightly above the base 31 of the apparatus. The nut retaining the grinding wheel on the end of the shaft 21 is first removed, if the particular grinder is so equipped. The hand-like member 69 of the clamp is swung into position on the top of the grinding wheel 13 with its fixed fingers 71 and 73 engaging the periphery of the grinding wheel. The movable finger 75 is brought into engagement with the periphery of the grinding wheel by downward pivotal movement of the arm 79. With the arm urged downwardly to hold the movable finger 75 in engagement with the periphery of the grinding wheel, the arm may be rotated in a suitable direction, either clockwise or counterclockwise, to remove the grinding wheel from the shaft 21 of the portable industrial grinder. The non-circular collar 17 of the grinder will engage the walls of the slot 43 of the top wall 41 of the housing 29 to prevent the grinder from rotating while the grinding wheel is removed. The motor housing 27 of the grinder will drop a slight distance to the base 31 of the housing to permit disengagement of the grinding wheel from the shaft 21. During this procedure, the shaft collar 17 is engaged by the walls of the slot 43 of the top wall of the housing so that the apparatus will remain in an upright position when the grinding wheel is removed. A new grinding wheel can then be installed on the shaft 21 and, after installation of a nut, if one is needed, the grinder is ready to be replaced in service.

I claim:

1. An apparatus for use in removing and replacing a grinding wheel of a portable industrial grinder of the type having an output shaft, a grinding wheel support sleeve on the output shaft, a non-circular collar formed on the sleeve, and laterally extending handles, said apparatus including:

an upstanding housing having a top wall with a slot therein, which slot is open at one end and is dimensioned to receive and engage the non-circular collar of the shaft support sleeve of the portable grinder with the grinding wheel being supported on the top wall, said housing having an opening in at least one side thereof to permit the portable grinder to be positioned in the housing below the slotted top wall thereof, a grinding wheel clamp adapted to engage the grinding wheel when it is supported on the top wall of said housing, with the grinding wheel clamp having two fixed fingers which engage the periphery of the grinding wheel at circumferentially spaced locations thereon and a movable finger circumferentially spaced relative to the two fixed fingers, which movable finger can be moved in and out of clamping engagement with the grinding wheel, said movable finger being formed as part of an arm which can be used as a handle to rotate the heel clamp and thereby unloosen the grinding wheel from the shaft of the portable grinder, and a support arm which extends over the top wall of the housing and is pivotally mounted relative to the housing for rotation about a vertical axis, said grinding wheel clamp being pivotally connected to said support arm and slidable along the length of a portion of the support arm.

2. The apparatus of claim 1 in which said grinding wheel clamp is releasably lockable at selected positions along the length of a portion of said support arm.

3. The apparatus of claim 1 in which said movable finger is pivotally mounted for movement at right angles to the direction of unloosening rotation of the grinding wheel so that the arm of which the finger is a part can be used both to clamp the grinding wheel and to rotate it for loosening the grinding wheel.

4. The apparatus of claim 1 in which the housing is provided with walls on its sides adjacent the side having the opening into the housing with said adjacent walls having vertical edges which are set back from the opening into the housing so as to not interfere with the grinder handles when the grinder is positioned in the housing.

* * * * *